Aug. 19, 1969  C. E. BROWN ET AL  3,461,855
"G" CONDITIONING SUIT
Filed Feb. 2, 1965  3 Sheets-Sheet 3

INVENTORS
CLINTON E. BROWN
RALPH W. STONE, JR

BY

ATTORNEYS

United States Patent Office 3,461,855
Patented Aug. 19, 1969

3,461,855
"G" CONDITIONING SUIT
Clinton Eugene Brown, Silver Spring, Md., and Ralph W. Stone, Jr., Newport News, Va., assignors to the United States of America as represented by the Administrator of the National Aeronautics and Space Administration
Filed Feb. 2, 1965, Ser. No. 429,932
Int. Cl. A61b *19/00*
U.S. Cl. 128—1             15 Claims

ABSTRACT OF THE DISCLOSURE

The "G" conditioning suit is a device operative on the cardiovascular system of a body to make it function as it normally does in a gravity environment. The suit structure and associated apparatus is designed such that a decreasing pressure is applied from the area of the head to the feet thus controlling the flow of blood in a body to accomplish the result gravity has on the cardiovascular system.

---

The invention described herein may be manufactured and used by or for the Government of the United States of America for governmental purposes without the payment of any royalties thereon or therefor.

This invention relates to a gravity simulation device, and more particularly to a suit having a pressurized body engaging arrangement operative on the cardiovascular system of the body causing blood therein to assume conditions like that of the cardiovascular system in a gravity environment.

With the advent of space flight, the affect of long periods of weightlessness on the human body has become apparent. Since the normal position of the body during wakeful hours is either that of sitting or standing, the blood tends to settle or pool in the lower body portions and the cardiovascular system works to prevent this action. In the absence of a gravitational field this does not occur, resulting in reduced workload and strain on the cardiovascular system of the space traveler which can be detrimental to health particularly on return to earth and the normal gravitational environment. Space travelers after returning to the gravitational field have experienced fainting tendencies and it is believed that over long intervals in weightlessness the skeletal structure tends to demineralize, the muscles lose tone, and the cardiovascular system degrades from its normal state.

With the contemplation of extended space flights of several orbits, trips to the moon, other planets, and extended stays in manned orbiting laboratories, it will be necessary to provide means to simulate the gravity environment to provide comfortable living conditions. One suggested means for providing a simulated gravity environment is that of the centrifuge. With this arrangement mechanism would be provided whereby the astronaut carrying compartment could be rotated about a central hub or some other mechanism could be used to provide a centrifugal force on the astronaut. This is a rather well known principle whereby in the gravity environment this technique is utilized to provide a force of several additional gravities. Although this arrangement would overcome the difficulty with the cardiovascular system and the sensations experienced by the astronaut, elaborate mechanism is necessary to provide the necessary centrifugal force. Since it is more desirable to substitute articles such as food, scientific experiments, etc., for the weight required by centrifuge mechanism, it is desirable to have some other means which would accomplish the same result. Furthermore, the centrifuge arrangement is usually limited to the space vehicle, space laboratory or other main base operation in space. Thus, if the astronaut desires to leave the base of operation for extended exploration, the centrifuge technique would not be available.

The invention here under consideration is believed to solve the above-discussed problem and provide an arrangement for simulating gravity which is of relatively simple design and portable in nature.

It is, therefore, an object of this invention to provide a means for simulation of the effects of a gravitational force in the space environment.

Yet another object of this invention is to provide a device for simulating gravity in a weightless environment wherein the cardiovascular system of the body is conditioned by the invention mechanism such that it appears to the body that it is in a gravitational field.

Still another object of this invention is to provide a gravity simulation device for use in the space environment which is of a portable nature, light in weight, highly reliable and provides the necessary comfort for the astronaut.

Another object of this invention is to provide a gravity simulation device for use in the space environment which applies a decreasing pressure from the upper body to the lower body such that the blood in a space environment is similar to that of a fluid under hydrostatic conditions in a gravity environment.

An additional object of the invention is to provide a gravity simulation device for use in the space environment wherein the construction material itself is utilized to vary the pressure applied by different components of the system.

An object of the invention is to provide a method for simulating the effects of gravity in the weightless space environment.

A further object of the invention is to provide a gravity simulation device wherein a common pressure source supplies individual components which drop the pressure of the common source to the degree necessary at the particular point of body application.

An added object of the invention is to provide a gravity simulation device wherein the components of the system are all interconnected from the upper body to the lower body and a pressure gradient is provided from top to bottom as the fluid passes through the system.

Another object of the invention is to provide a gravity simulation device having a pulsating pressurization grouping operative on the cardiovascular system.

Yet another object of the invention is a gravity simulation device which places a compressive load on the body along its lengthwise axis.

These and other objects and advantages of the invention will become more apparent upon reading the specification taken in conjunction with the accompanying drawings.

Basically, this invention relates to a gravity simulation device or cardiovascular conditioning suit. A general embodiment of the suit or garment is made up of fabric of rather conventional design having a body section with attached sleeves and leg portions. The garment carries a tubular system which includes a number of torus shaped tubes which surround the body, legs and arms. These are connected to a common line which is in turn connected to a source of pressure. A helmet or head enclosure and sealing collar are used to pressurize the head. Means is provided for regulating the amount of pressure applied by the helmet and each torus to the particular portion of the body with which it is associated. As an example, pressure is varied from about 2½ to 3 pounds per square inch above ambient pressure at the upper body (head) to the ambient pressure that is the pressure of the body environment adjacent the feet.

Figure 1:
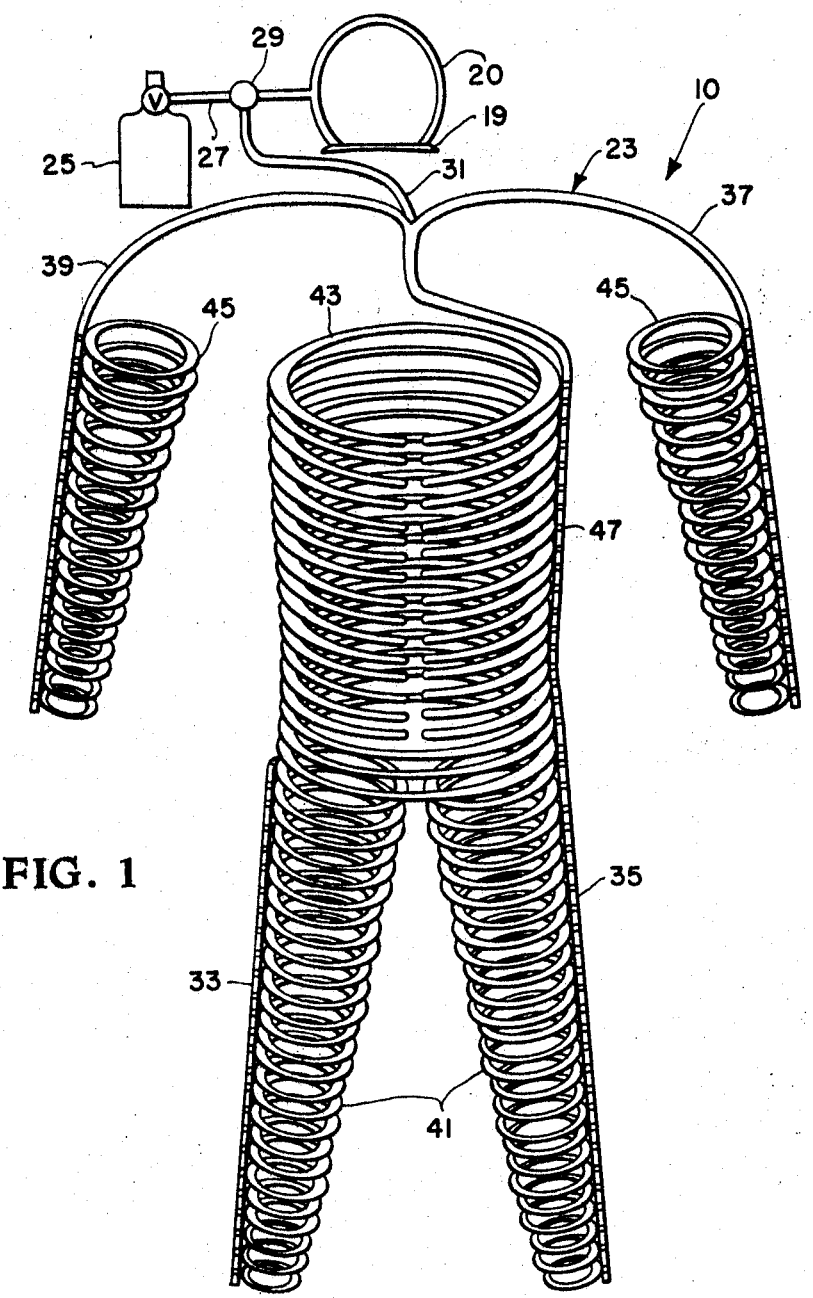
FIG. 1 is a perspective view showing a pressure system including the supply source and a pressure line grouping with its encircling members.
Figure 2:
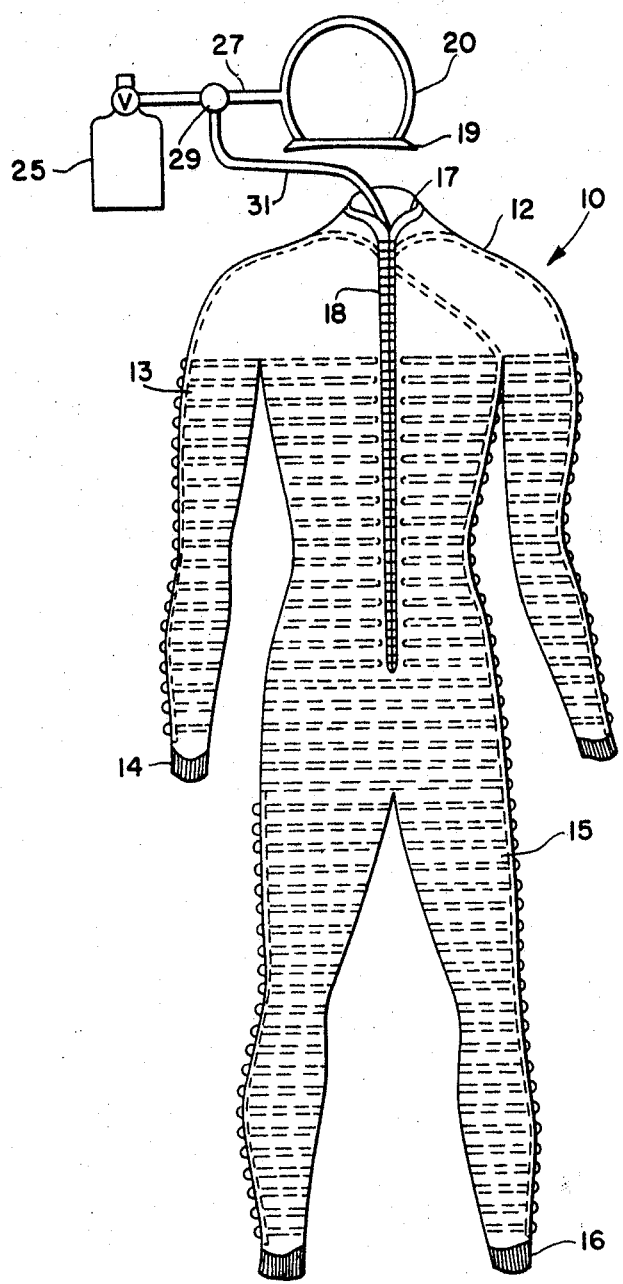
FIG. 2 is an elevational view showing the pressure line grouping of FIG. 1 associated with a garment or suit.

Referring now more specifically to the details of the invention, FIGS. 1 and 2 show the gravity simulator system, designated generally by the reference numeral 10.

The system 10 is shown associated with a garment 12 (FIG. 2) of rather conventional design having sleeves 13 with cuffs 14, legs 15 with anklets 16, a neck opening 17 and a fastener 18 such as a zipper or the like to provide ease of ingress and egress. The suit has an inner and outer layer 21 and 22, respectively (FIGS. 3 and 4) between which are sandwiched the pressure grouping now to be described. The suit may also be supplied with lacing or other fastening techniques along the limbs and torso which will allow the suit to be adjusted in size for the specific wearer.

The pressure grouping, designated generally by the reference numeral 23, is shown separated from the garment 12 in FIG. 1, and associated therewith in FIG. 2. As illustrated in FIG. 2, the grouping is associated with the various elements of the garment and may be retained in the position shown by an adhesive or sewing the garment. It is believed apparent from FIG. 1 that the tubes would engage the inner suit layer which in turn contacts various parts of the body. It should be understood that the garment layers or layer may be elastic or without elasticity. A helmet or enclosure 20 is provided to enclose the head. Associated with the helmet is a collar 19 adapted to fit with the neck opening to seal the head compartment from the remainder of the suit. The helmet and collar arrangement may be similar to that used by the high altitude aviator. A portion of the helmet is transparent to allow the astronaut to see.

The pressure grouping includes a source 25, which may be a bottle of compressed air or other fluid, or an air line having a receptacle to which the supply line may be connected (not shown). The latter arrangement may be desirable when the astronaut is working in a space laboratory wherein air lines may be run thereabout and provided with a central supply source. The compressed air bottle would be a more versatile arrangement and could be utilized under all environmental conditions.

A supply line 27 interconnects the source 25, the helmet 20 and the main pressure line 31. A main pressure regulator 29 is placed in the supply line 27 (of conventional design) to control the pressure to the suit and helmet.

The lower extremity of the main line 31 branches off into leg pressure lines 33 and 35. The upper portion of the main pressure line 31 separates into arm pressure lines 37 and 39.

Body tubes or tori 43 are designed so as to generally conform to shape of the body and surround the body. They are connected to the main pressure line 31. The tubes 43 may be connected directly to the main line 31 or through pressure regulators 47. One means of varying the pressure which the tubes apply to the body is by varying the elasticity of the material of which the tubes are constructed, the pressure within the tubes remaining generally constant. This can also be accomplished by varying the thickness of the tube walls resulting in greater or lesser expansion with a constant pressure. This applies varying degrees of pressure to the cardiovascular system. Another method is to vary the pressure supply to the individual tubes or torus with a very simple pressure regulator 47 of conventional design.

The legs are provided with generally annular shaped tubes or tori 41, again designed to fit the general configuration of the leg. These tori are connected to the leg pressure lines through pressure regulators or directly and the elasticity or thickness of the tubes varied to provide the varying pressure.

Figure 3:
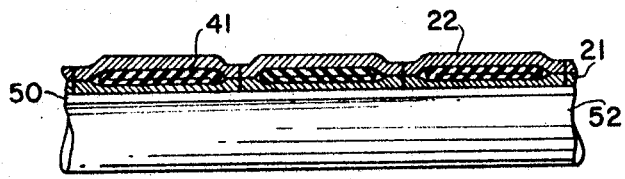
FIG. 3 is a cross-sectional view showing the application of the invention to the skin and blood channel, the system being unpressurized.
Figure 4:
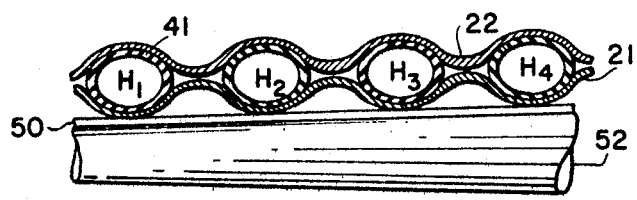
FIG. 4 is a cross-sectional view of the invention as applied to skin and a blood channel, the system shown pressurized.

The suit 10 is shown in FIG. 3 in a deflated condition lying against body skin 50, with a blood vessel 52 located adjacent the skin. FIG. 4 shows the suit 10 inflated and the compressing and blood-directing effect the suit has on a blood vessel due to the varying pressure $H_1$ through $H_4$.

The arm pressure lines are also provided with tubes or tori 45 designed to the general configurations of the arms. These tori are connected to the arm pressure line by pressure regulators or the pressure is regulated in the manner previously described. Although not shown, it is considered to be within the scope of the invention to pressurize each of the tori individually from a manifold arrangement. Generally, however, this arrangement is considered somewhat cumbersome due to the large number of supply lines necessary from the manifold. Obviously, the manifold could be constructed so as to emit the desired pressure to each tube or torus thus carrying out the concept of the invention. It should be understood that the tubes may be designed to go over the shoulder area or the area above the tubes between the layers of the suit so the collar may be pressurized.

Figure 5:
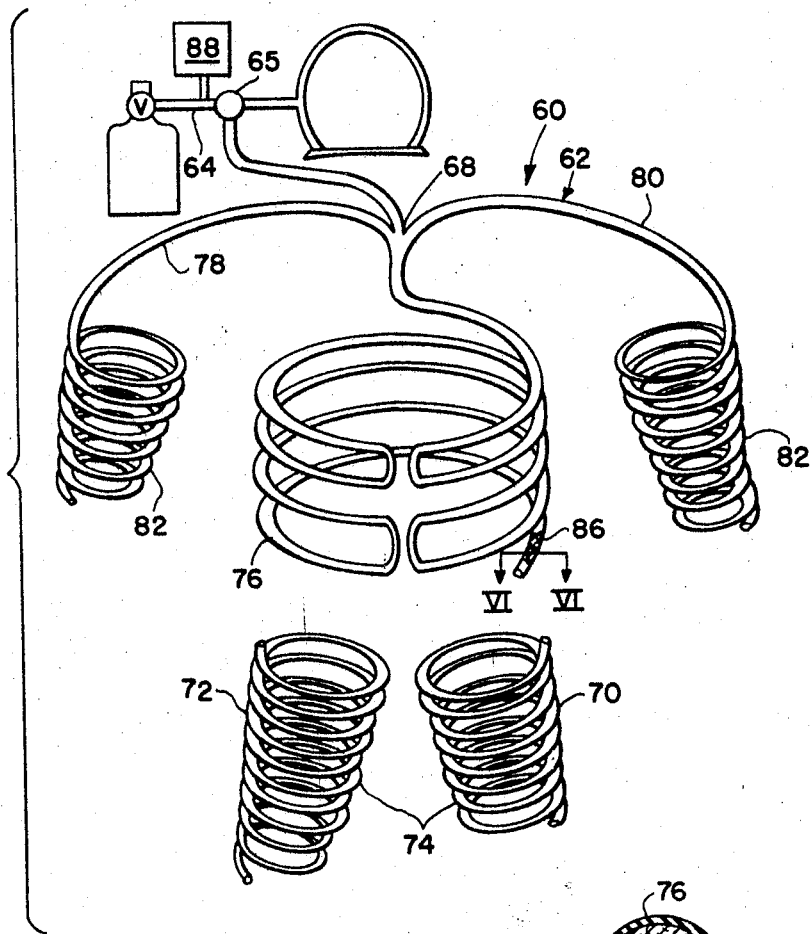
FIG. 5 is a perspective view showing a modified form of the pressure grouping.

FIG. 5 shows a modified form of the invention designated generally by the reference numeral 60. The pressure grouping 62 is similar to the pressure grouping 23 in body engaging layout; however, differs in that the tubing or lines are continuous from the upper part to the lower part. Although the line is a continuous member, sections of it have been numbered for purposes of clarity. The helmet and collar arrangement is the same.

The pressure grouping 62 includes a feedline 64, and main pressure regulator 66. The main pressure regulator 66 joins the feedline 64 with the common pressure line 68, distributing pressure to the helmet and the body encircling tube.

The common pressure line 68 leaves the main pressure regulator 66 and forms body loops 76. The line then separates forming leg lines 70 and 72. The leg lines 70 and 72 form leg loops 74 as they continue to their lower extremities.

The upper portion of common pressure line 68 separates to form arm lines 78 and 80. Arm line loops 82 are formed in the arm lines 78 and 80 respectively.

Figure 6:
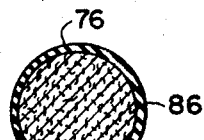
FIG. 6 is a cross-sectional view taken along the section lines VI—VI of FIG. 5.

As shown in the body loop 76, and in the cross section illustrated in FIG. 6, the lines and their loops are filled with a porous or fibrous mass 86. The porosity is arranged such that a pressure gradient from the top to bottom of the continuous loop is established as a result of the net loss of energy as the fluid passes through the pressure grouping.

Equipment 88 to provide a pulsating pressure to the system is shown in FIG. 5. This is of conventional design and is connected into the pressure line ahead of the main pressure regulator. Obviously the pulsating equipment can be utilized with any of the embodiments of the system.

It should be understood that the pressure grouping 62 may be associated with a garment such as 12 and would be positioned between layers of the garment in a manner similar to that previously explained.

Figure 7:
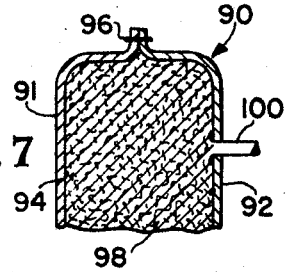
FIG. 7 is a cross-sectional view of a portion of an alternate form of cardiovascular conditioning suit.

An alternate form of the invention is shown in FIG. 7 and designated generally by the reference numeral 90. A portion of a garment 91 is shown with an inner layer 94 and an outer layer 92 with a porous or fibrous mass 98 positioned between the layers. The inner and outer layers are joined at the edges to form a seam 96 and airtight container in a complete suit. With this arrangement, the air pressure would be introduced at the upper portion of the suit (in the vicinity of the neck opening) by a supply line 100 and be allowed to pass to the lower portion through the fibrous material. Such an arrangement would be of homogeneous design as opposed to the tubular arrangement shown in pressure groupings 23 and 62. The porosity of the mass would vary from the upper to the lower portion to give the proper pressure gradient. A helment and collar arrangement would be used with this embodiment similar to that shown in FIGS. 1 and 2.

The tori or loops shown in the respective pressure groups 23 and 62 are shown adjacent each other. It is important that when inflated, the adjacent edges of the tubes touch each other to provide continuous application of pressure to the underlying flesh as opposed to a system of discrete tourniquets. Generally it has been found that the more tubes there are and the closer they are spaced together, the more desirable the arrangement.

When higher pressures are used some difficulty may be experienced in flexing the arms, waist, etc., due to the encircling tubes. Under these circumstances, spaces can be left between the tubes at the elbows, etc., or joints designed to provide the necessary mobility.

The invention is also useful as a device to place a compressive load on the lengthwise axis of the skeletal structure of the body. When the suit is pressurized, it changes dimensionally since the tubes round out. The dimensional change is that of shortening as well as expansion. However, the suit also grips the wearer so that it also tends to shorten the wearer thereby placing a compressive load along the longitudinal axis of the body. The helmet being attached to the suit forms an integral part of the compressive effect since pressure is applied directly to the top of the head. Obviously, this arrangement loads the skeletal structure in the general manner it would be loaded in the gravity environment.

OPERATION

From the above description of the invention, it is believed that the operation thereof is apparent.

In each embodiment of the invention it is necessary to release the pressurized source so as to energize the helmet and particular pressure grouping. The pressure of the source is scaled down by the main pressure regulator and applied to the helmet and a lesser pressure to the body tori or loops, the pressure being further decreased in the leg area. This pressure is set proportional to the height above the feet, being equal at the head of the body to the hydrostatic pressure of a column of blood of body height. The application of the pressure gradient being transmitted through the device as it is applied to the body and its blood system causes the blood to act as if it were in a gravitational field and forces it from the upper body including the head to the lower body (feet) as shown in FIG. 4. It can be seen that the higher pressure $H_1$ and the decreasing pressures $H_2$, $H_3$, etc., cause a gradual tapering of the blood channel.

It should also be noted that when a pulsating pressure is associated with the various arrangements, the blood tends to be milked toward the lower body portion.

It is believed clear that it is a simple matter to control the pressure to the various tori by use of a pressure regulation device at the interconnection of the tori with the main lines. Also, this may be accomplished by varying the thickness or the elasticity of the various tori. As pointed out above, a pressure gradient can also be established by varying the degree of porosity of a filler which may be placed in the tubes or a homogeneous type suit.

From the above description, it should be recognized that a new and unobvious arrangement for simulating gravity is accomplished. Obviously, there is no comparison between the simplicity of the invention arrangement and that of the centrifuge proposed for the simulation of gravity in the space environment. Many apparent advantages are provided by the invention including the great savings in cost, simplicity with the inherent result of reliability. The arrangement is mobile providing for experiments in the space environment which would otherwise be impossible. The simulation technique including the garment and associated pressure groupings are readily adaptable to a variety of physiques. Since the device is directly operative on the cardiovascular system of the body, the effects on the human body due to a spinning environment and attendant to the centrifuge are eliminated. Thus, the space traveler is more comfortable even though he must wear the garment, than he would be in the spinning environment, particularly over extended time intervals. Since the invention is a cardiovascular conditioning device, it also has therapeutic value. By increasing the pressure in the pressure groupings an environment of greater than normal earth gravity may be produced. Thus, the device may be used as a gravity simulator in other than the space environment. The suit also places a compressive load on the body, important to the health of the space traveler.

It is to be understood that the foregoing disclosure relates only to preferred embodiments of the invention, and that numerous modifications and variations of the present invention are possible in the light of the above teachings without departing from the spirit or scope of the invention, as set forth in the appended claims.

What is claimed as new and desired to be secured by Letters Patent of the United States is:

1. A gravity simulation device adapted for use on the human body comprising: a garment; an enclosure adapted to enclose a head attached to said garment; tube means adapted to encircle a body fixed to the garment; means for pressurizing the head enclosure and the tube means to bring pressure against blood carrying channels of a body; and means for decreasing the pressure applied from the area of the head to the area of the feet whereby blood assumes that of blood in a cardiovascular system in a gravity environment.

2. A gravity simulation device as in claim 1 wherein main line interconnects with individual tubes adapted to encircle the body; and pressure regulator means is positioned at the interconnection of said tubes and main line.

3. A gravity simulation device as in claim 1 wherein said means for pressurizing the tubes is a pressurized bottle adapted to be carried by an individual.

4. A gravity simulation device as in claim 1 wherein said means for decreasing the pressure applied by the tubes is the elastic properties of individual encircling tubes.

5. A gravity simulation device as in claim 1 wherein the means for decreasing the pressure applied by the tubes is the thickness of individual encircling tubes.

6. A gravity simulation device as in claim 1 wherein the means for decreasing the pressure applied by the tubes is filler means in the tubes offering varying resistance to flow in the tubes.

7. A gravity simulation device adapted for use on an animal body comprising: means adapted to encase and engage a body; passage means formed in said means adapted to encase and engage a body; means for pressurizing said passage means; and means for varying the pressure applied to various areas of the means encasing and engaging a body whereby a body can be acted upon so that blood thereof assumes that of blood in a cardiovascular system subjected to a gravity environment.

8. A gravity simulation device adapted for use on the human body comprising: a garment adapted to cover a body; an enclosure adapted to enclose a head attached to said garment; said garment having an inner and outer surface joined to form a container; porous means of varying porosity placed between said inner and outer surfaces; and means for pressurizing said head enclosure and container whereby a pressure can be applied to a body; said porous means being so constructed and arranged that there is a pressure gradient from top to bottom due to loss of energy as the fluid passes through the system whereby a body can be acted upon causing the blood therein to assume that of blood in a cardiovascular system subjected to a gravity environment.

9. A gravity simulation device adapted for use on the human body comprising: a garment with inner and outer layers with portions adapted to cover arm, leg and body trunk member portions; encircling tori positioned between the layers of all portions of said garment at intervals therealong; a helmet adapted to enclose a head; a collar joining said garment and helmet and sealing one from the other; a supply line communicating with said helmet and said tori; a compressed fluid bottle for pressurizing said supply line; and means for regulating the pressure to said helmet and said tori whereby said garment acts upon a body so that blood therein assumes that of blood in a cardiovascular system subjected to a gravity environment.

10. A gravity simulation device adapted for use on the human body in claim 2 wherein the tube means is a continuous tube adapted to encircle the body.

11. A gravity simulation device as in claim 10 wherein means provides pulsating pressure to the helmet and the continuous tube to milk the blood from the upper to lower body.

12. An apparatus for preventing demineralization of the skeletal structure and loss of muscle tone in a human body subjected to a zero-G environment comprising: means adapted to encase and engage a body; and means causing said encasing and engaging means to contract upon a body placing a compressive load along a lengthwise axis passing through a head area to a feet area of a body.

13. A method of simulating gravity in a human body comprising the steps of: enclosing a body head in a pressurizable container; encircling the remainder of a body with tubular members; pressurizing the container and tubular members; and applying a decreasing pressure from a body head to a body feet area.

14. A method of simulating gravity in a human body comprising the steps of: enclosing substantially all of a body in a pressurizable container; pressurizing the container and thereby applying a pressure to a body; and applying a greater pressure in a head area of the body enclosing container than in a feet area of the body enclosing container.

15. A method of simulating gravity in a human body comprising the steps of: enclosing a body head in a pressurizable container; encircling the remainder of a body with tubular members; pressurizing the container and tubular members; applying a pressure gradient from the head area to the feet area of a body so that the pressure difference between arterial blood and adjacent body surface at any height above the feet is equivalent to the hydrostatic head of blood in a gravity environment at the same height.

References Cited

UNITED STATES PATENTS

| | | | |
|---|---|---|---|
| 1,608,239 | 11/1926 | Rosett | 128—44 |
| 2,345,073 | 3/1944 | Rosett | 137—625.11 |
| 2,495,316 | 1/1950 | Clark et al. | 128—1.01 |
| 2,531,074 | 11/1950 | Miller | 128—38 |
| 2,781,041 | 2/1957 | Weinberg | 128—60 |

L. W. TRAPP, Primary Examiner